United States Patent
Steffes

[19]

[11] Patent Number: 6,116,146
[45] Date of Patent: Sep. 12, 2000

[54] RADIAL PISTON MACHINE

[75] Inventor: Helmut Steffes, Hattersheim, Germany

[73] Assignee: ITT Manufacturing Enterprises, Inc., Wilmington, Del.

[21] Appl. No.: 08/849,782

[22] PCT Filed: Nov. 18, 1995

[86] PCT No.: PCT/EP95/04543

§ 371 Date: Aug. 14, 1997

§ 102(e) Date: Aug. 14, 1997

[87] PCT Pub. No.: WO96/18035

PCT Pub. Date: Jun. 13, 1996

[30] Foreign Application Priority Data

Dec. 9, 1994 [DE] Germany ............................. 44 43 868

[51] Int. Cl.[7] ....................................................... F01B 1/00
[52] U.S. Cl. .................................. 92/72; 92/138; 92/129
[58] Field of Search ........................... 92/12.1, 72, 138,
92/129; 417/273

[56] References Cited

U.S. PATENT DOCUMENTS 2,324,291 7/1943 Dodge .
2,936,632 5/1960 Palmer .
3,000,319 9/1961 Tuck .............................................. 92/72
4,589,329 5/1986 Oberdorfer ................................... 92/72
4,983,100 1/1991 Budecker .................................. 417/271
5,573,386 11/1996 Schmitt et al. .......................... 417/273

FOREIGN PATENT DOCUMENTS

| 1417269 | 4/1965 | France . |
| 1009487 | 5/1955 | Germany . |
| 1922885 | 1/1970 | Germany . |
| 2852852 | 2/1981 | Germany . |
| 3240405 | 5/1984 | Germany . |
| 632057 | 9/1982 | Switzerland . |
| 763095 | 12/1956 | United Kingdom . |
| WO 9618035 | 6/1996 | WIPO . |

*Primary Examiner*—Thomas E. Denion
*Attorney, Agent, or Firm*—Rader, Fishman & Grauer PLLC

[57] ABSTRACT

The present invention relates to a radial piston machine including radial pistons which are guided in the direction of the piston axis in a housing, a driver which is coupled to the radial pistons, and an eccentric drive which is arranged inside the driver following the motion sequence of the eccentric gear. Perpendicular to the piston axis, a radial clearance which corresponds at least to the stroke of the radial piston is adjustable between the eccentric gear and the driver.

7 Claims, 1 Drawing Sheet

RADIAL PISTON MACHINE

FIELD OF THE INVENTION

The present invention relates to a radial piston machine, in particular for automotive vehicle brake systems with wheel slip control and driving stability control.

BACKGROUND OF THE INVENTION

U.S. Pat. No. 2,324,291 discloses a radial piston machine including a star-shaped driving means on which radial pistons abut which are arranged like a star in the housing. The driving means is slipped onto stamp-like projections of the radial pistons to guide the radial pistons. This provides a positive clamping engagement of the piston stamps so that, on rotation of an eccentric gear arranged in the driving means, the movement of the driving means follows the movement of the eccentric. Due to the disclosed arrangement of the radial pistons on the driving means and the arrangement of the driving means with respect to the eccentric, a relative movement occurs between the contact surfaces of the piston stamps and the driving means which, due to friction on the contact surfaces and a tilting moment effect of the radial pistons in the housing, reduces the pump output and forces the driving means to clamp the pump stamps, which has adverse effects on the rigidity of the driving means.

British patent specification No. 763 095 discloses a driving means for a radial piston pump which, for the assembly, has a bipartite design in a radial direction and embraces the eccentric drive. The relative movement between the driver and the eccentric gear is ensured by a radial clearance which is configured as a sickle-shaped slot. The driver, which is hence composed of half shells, in terms of its material strength, must be dimensioned so that the tensile stress caused by screws can be taken up by the driver both mechanically and geometrically. Accordingly, the driver has a large and heavy construction. In addition, it can only be mounted in a radial direction because it is screwed with the piston.

OBJECT OF THE INVENTION

Therefore, an object of the present invention is to improve a radial piston machine of the above mentioned type so that the shortcomings known from the state of the art are overcome by means which are as simple as possible, inexpensive and reliable in operation.

SUMMARY OF THE INVENTION

According to the present invention, this object is achieved in that the driver has an oval outside contour in the direction of the piston axis and also has an oval opening, extending perpendicularly to the piston axis, exhibiting the radial clearance and accommodating the eccentric gear, and in that the driver, in the direction of the radial pistons, has extensions which include lateral recesses to accommodate the radial pistons.

A preferred constructive aspect of the driver can be seen in a sickle-shaped slot provided between the driver and the eccentric gear. The slot extends perpendicularly to the piston axis in the driver and corresponds to the peripheral course of the eccentric curve. The piston force introduced into the driver causes a constant variation of mechanical tension in the driver so that the introduction of force from the radial piston to the smallest cross-section of the driver occurs with an even rise in tension and without involving the risk of a critical, excessive tension in the smallest cross-section of the driver.

To ensure a reliable, form-locking attachment of the radial piston on the driver, the driver has a lateral recess so that the driver can be slipped from the side onto the end portion of the radial piston.

An especially simple possibility of attaching the radial piston on the driver is achieved by the fork-shaped opening of the driver proximite its extension, thereby providing a reliable and, nevertheless, simple positive engagement.

To perform the movement of the driver exclusively translatorily and synchronously with the translatory movement of the radial piston, the driver along with the radial piston is aligned without a clearance in the direction of the piston axis and with a clearance in a direction perpendicular to the piston axis. Low-noise and low-wear operation of the radial piston machine is thereby achieved.

Due to the rigid engagement between the driver and the end of the radial piston, the axial forces of the piston, which act on on the radial piston, are introduced into the driver in a fashion symmetrically distributed over both flanks, with the result that the driver takes up the forces without additionally stressing the eccentric gear. With respect to its rigidity, the driver is rated so strong as to be able to take up, without deformation, the piston forces which act on it from a diametral direction and the actuating force that is exerted by the eccentric gear.

Further features, advantages and possible applications of the present invention can be seen in the following description of an embodiment.

DETAILED DESCRIPTION OF THE DRAWING

Figure 1:
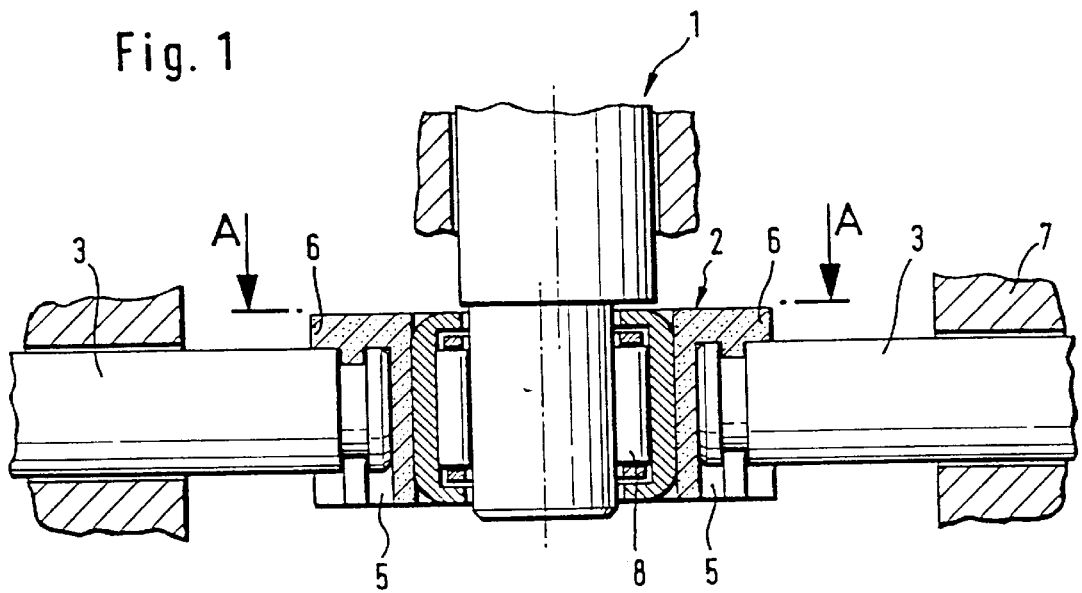
FIG. 1 is a longitudinal cross-sectional view of the driver and the eccentric gear.

FIG. 1 is a schematic view of a double-suction radial piston pump which actuates diametrally arranged radial pistons 3 in a housing 7 by way of an eccentric gear 1 and a driver 2. The eccentric gear 1 includes an eccentric shaft and a needle bearing 8 mounted on the shaft eccentric. The driver 2 is slid without a clearance on the bearing ring of the needle bearing 8 in the direction of the piston axis and retains each of the ends of the radial pistons 3 in a groove-shaped recess 5 on either side of the eccentric gear 1. The radial pistons 3 have annular grooves, thereby providing a positive engagement in conjunction with the recesses 5. The side surface of the driver 2, that points downwardly in the drawing, has an open section which permits a particularly simple mounting of the driver 2 on the diametrally arranged radial pistons 3. Normally, the radial pistons 3 are arranged already as a preassembled unit in the housing. The driver 2 can be introduced into the opening of the housing 7, either as a single part or as a preassembled unit along with the eccentric gear 1, until it is in positive engagement with the radial pistons 3. Preferably, the driver 2 is mounted almost without a clearance on the eccentric gear 1 in the piston direction so that the radial pistons 3 can follow the movement of the eccentric gear 1 synchronously.

Figure 2:
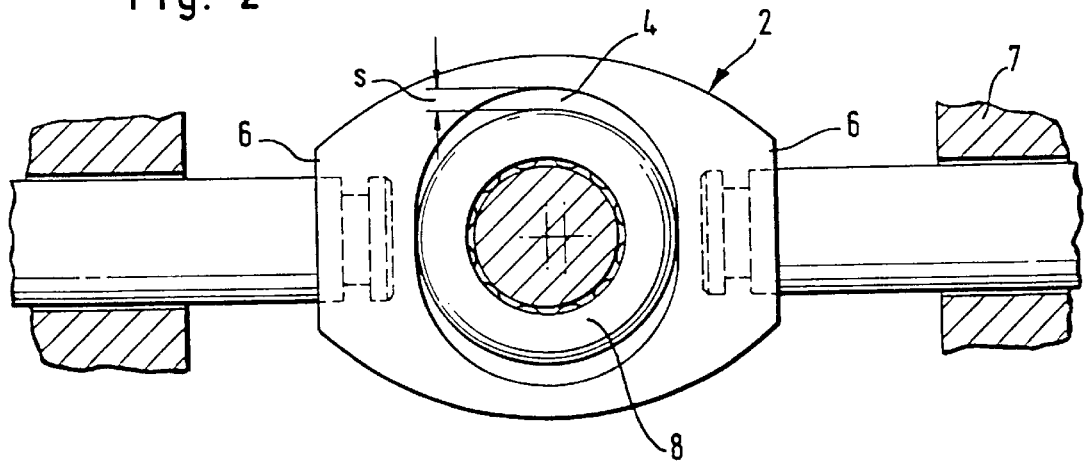
FIG. 2 is a side view of the features mentioned with respect to FIG. 1.

FIG. 2 shows a lateral view of the details described in FIG. 1 in the joining direction of the eccentric gear 1 with the driver 2 in the housing 7. The driver 2 has a substantially oval outside contour in the direction of the piston axis which has an ovally extending opening, also perpendicular to the piston axis, to accommodate the eccentric gear 1. The eccentric gear 1 bears without a clearance against the oval opening of the driver 2 in the direction of the piston axis. Perpendicular to the piston axis, a radial clearance s is provided between the eccentric gear and the driver which corresponds to the stroke of the two radial pistons 3 or the stroke of the shaft eccentric. The oval shape of the opening and the slot 4, which is generally predefined by the bearing ring of the eccentric gear 1, causes a sickle-shaped opening of the slot 4 in the piston position as shown in the drawing. The sickle-shaped opening of slot 4 is alternatingly reduced or increased until the radial clearance s on either side of the piston axis in dependence on the rotation of the eccentric gear 1. The bearing ring of the eccentric gear 1 moves on a curved track in the oval opening of the driver 2 which corresponds to the eccentric movement. The driver 2 has a relatively stiff design on either side of the eccentric gear 1 to support the two radial pistons 3. To this end, an extension 6, which receives the recess 5, is provided in the direction of the radial pistons 3. The extension 6 takes up the axial forces which act on the radial pistons 3 and introduces them, by distributing them as uniformly as possible, into the driver 2 in the direction of the cross-sectional area which is weakened by the oval opening. The driver 2 has so stiff a design that no inadmissibly high forces are applied to the bearing ring of the needle bearing 8. The driver 2 is preferably made of a sintered metal or is an extruded part which is favorable under manufacturing aspects. The corresponding material selection and the stiff construction of the driver 2 permits introducing the forces, which are transmitted from the outside to the driver 2 through the radial pistons 3, exclusively into the driver 2. In the static case, the piston forces act on the driver 2 in a way balanced in terms of amount and direction. The radial pistons 3 in the housing are free from transverse forces due to the merely oscillating movement of the driver 2 during the operation of the eccentric gear 1 so that friction losses and wear effects of the radial pistons in the housing 7 are minimized. The favorable guide and support of the driver 2 on the bearing ring of the eccentric drive 1 causes a low-friction roller movement between the shaft eccentric and the needles in the bearing ring. The amount of sliding friction which is produced between the bearing ring and the oval opening in the driver 2 is of little, if any, interest due to the low rotational speed of the bearing ring. A radial piston machine is thereby achieved which has a particularly simple design, involves low friction losses, a reliable guide and support of the radial pistons 3 and minimum possible tension of the needle bearing 8.

I claim:

1. A radial piston machine comprising:

a housing;

a plurality of radial pistons located at least partially within the housing, each piston having first and second ends and being guided in the housing in the direction of the piston axis, a driver coupled to the first ends of the radial pistons, the driver including an oval outside contour in the direction of the piston axis and an oval opening extending generally perpendicularly to the piston axis for receiving an eccentric gear of the radial piston machine;

a radial clearance provided perpendicular to the piston axis between the eccentric gear and the driver corresponds to the stroke of the radial pistons, the radial clearance being variable based on rotation of the eccentric gear;

a plurality of extensions formed on the driver wherein each driver extension includes a lateral recess for positively engaging the first end of a respective radial piston for permitting the driver to be assembled laterally from one side onto the first end of the radial piston.

2. The radial piston machine as claimed in claim 1, wherein, the radial clearance is a sickle-shaped slot.

3. The radial piston machine as claimed in claim 1, wherein the first end of each radial piston has an annular groove for positive retention with the driver.

4. The radial piston machine as claimed in claim 1, wherein each driver extension is opened like a fork for positively retaining the respective first end of a radial piston.

5. The radial piston machine as claimed in claim 1, wherein the movement of the driver occurs exclusively translatorily and synchronously with the translatory movement of the radial piston, to which effect the driver along with the radial piston is arranged without a clearance in the direction of the piston axis.

6. The radial piston machine as claimed in claim 1, wherein the driver is rigidly fixed on the end of the radial piston.

7. The radial piston machine as claimed in claim 1, wherein each driver extension takes up axial forces acting upon the respective radial piston and actuating forces generated by the eccentric gear by distributing the forces to the driver in the direction of oval opening.

* * * * *